United States Patent
Shearer (10) Patent No.: US 10,666,461 B2
(45) Date of Patent: May 26, 2020

(54) VLAN REFLECTION (71) Applicant: ADVA Optical Networking SE, Meiningen-Dreißigacker (DE)

(72) Inventor: Timothy J. Shearer, Chapel Hill, NC (US)

(73) Assignee: ADVA OPTICAL NETWORKING SE, Meiningen-Dreißigacker (DE)

( * ) Notice: Subject to any disclaimer, the term of this patent is extended or adjusted under 35 U.S.C. 154(b) by 58 days.

(21) Appl. No.: 16/002,720

(22) Filed: Jun. 7, 2018

(65) Prior Publication Data
US 2019/0379559 A1 Dec. 12, 2019

(51) Int. Cl.
*H04L 12/28* (2006.01)
*H04L 12/46* (2006.01)
*H04L 12/931* (2013.01)

(52) U.S. Cl.
CPC ...... *H04L 12/4679* (2013.01); *H04L 12/4666* (2013.01); *H04L 49/354* (2013.01)

(58) Field of Classification Search
None
See application file for complete search history.

(56) References Cited

U.S. PATENT DOCUMENTS

| 5,394,402 | A | 2/1995 | Ross |
| 6,639,901 | B1 | 10/2003 | Katzri et al. |
| 7,496,052 | B2 | 2/2009 | Jain et al. |
| 7,548,541 | B2 | 6/2009 | Ishwar |
| 7,577,142 | B2 | 8/2009 | Kloth |
| 7,633,956 | B1 * | 12/2009 | Parandekar ......... H04L 12/2859 370/351 |
| 8,953,590 | B1 * | 2/2015 | Aggarwal ........... H04L 12/4675 370/389 |
| 9,735,983 | B1 * | 8/2017 | Sharma ............... H04L 12/4675 |
| 10,397,049 | B2 * | 8/2019 | Boutros .............. H04L 41/0806 |
| 2010/0027549 | A1 * | 2/2010 | Satterlee ............. H04L 12/4641 370/395.31 |
| 2010/0329265 | A1 | 12/2010 | Lapuh |

(Continued)

OTHER PUBLICATIONS

Dynamic VLAN Assignment and Auto Smartport Configuration on a SG350X and SG550X, Copyright 2017, 19 pages, Cisco Systems, Inc. San Jose California.

(Continued)

*Primary Examiner* — Kwang B Yao
*Assistant Examiner* — Juvena W Loo
(74) *Attorney, Agent, or Firm* — Kevin E. Flynn; Flynn IP Law (57) ABSTRACT

A network edge device may be placed at a location to participate in a VLAN using a specific VLAN ID without expressly programming the network edge device to use that specific VLAN ID. The network edge device is connected to a network to receive ingressing frames from the network and to send egressing frames to the network. The network edge device copies a specific VLAN ID from an ingressing VLAN message into memory and subsequently reads the specific VLAN ID from the memory for use in tagging frames egressing from the network edge device with the specific VLAN ID so that the egressing frames are VLAN conformant. The network edge device may communicate with non-edge devices at the same location as the network edge device.

21 Claims, 6 Drawing Sheets

(56) References Cited

U.S. PATENT DOCUMENTS

| | | | |
|---|---|---|---|
| 2011/0032843 A1* | 2/2011 | Papp | H04L 12/4666 |
| | | | 370/254 |
| 2015/0098474 A1 | 4/2015 | Ganesan | |
| 2015/0195104 A1* | 7/2015 | Okuno | H04L 69/08 |
| | | | 370/392 |
| 2015/0381531 A1* | 12/2015 | Huang | H04L 12/4645 |
| | | | 370/401 |
| 2016/0006613 A1* | 1/2016 | Dong | H04L 12/462 |
| | | | 370/236 |
| 2016/0134591 A1* | 5/2016 | Liao | H04L 12/6418 |
| | | | 726/15 |
| 2016/0149724 A1* | 5/2016 | Wang | H04L 12/46 |
| | | | 370/392 |

OTHER PUBLICATIONS

Alcatel Technical Communication No. TC0601 Ed. 3: Automatic VLAN Assignment (AVA)—Implementation Guide and Restrictions, Nov. 6, 2006, 22 pages, Alcatel, Boulogne-Billancourt, France.
Markus Raible, Extended European Search Report for European Patent Office Application No. 19170350.3 (EPO Version of the Application in U.S. Appl. No. 16/002,720), dated Nov. 11, 2019, 11 pages, European Patent Office, Munich, Germany.

* cited by examiner

| 1004 | Associate VLAN ID to Router |
| 1008 | Configure Network VLAN-aware Switches |
| 1012 | Router Advertisement Broadcast |
| 1016 | Store VLAN-ID from Broadcast at Network Edge Devices |
| 1020 | Devices at Location 400 Respond to Broadcast with Frames that Include the Stored VLAN-ID |
| 1024 | Devices at Location 450 Respond to Broadcast with Frames that Include the Stored VLAN-ID |
| 1028 | END |

VLAN REFLECTION

BACKGROUND

Field of the Disclosure

This disclosure relates generally to computer networks and, more specifically, a technique for equipment to automatically adapt itself in order to communicate on a Virtual Local Area Network (VLAN).

Related Art

OSI and LANs.

Data communication from one endpoint to another endpoint is achieved by adding various communication protocol layers. The Open Systems Interconnect model (OSI) and the way data is carried from endpoint to endpoint across switches and routers is described in a way accessible to non-experts at http://www.practicalnetworking.net/series/packet-traveling/packet-traveling/(spaces inserted to avoid a live link).

| Layer | |
|---|---|
| Layer 5+ | There are other layers that deal with nuances of the application software but this is beyond the focus of the present application. |
| Layer 4 | Transport - Deliver packets with extra information to form a structure known as segments. This layer distinguishes several different streams of data coming to a computer to support email, music, and other applications. |
| Layer 3 | Network - Deliver frames with extra information to form a structure known as packets from one end of the network to the other. (focus on end to end) |
| Layer 2 | Data Link - Send data with extra information to form a structure known as frames to the next uniquely identified device on the path from end to end. (focus on next hop) |
| Layer 1 | Physical - Transmission and reception of raw bit streams over a physical medium. |

VLANs.

To understand VLANs, it is first necessary to have an understanding of LANs. A Local Area Network (LAN) can generally be defined as a broadcast domain. Hubs, bridges, switches, or other Layer 2 devices in the same physical segment or segments connect all end node devices. Routers and other devices higher than Layer 2 define the boundaries between broadcast domains.

Within a LAN, devices can communicate to one another at Layer 2 as the device knows the MAC address of the destination or can discern the unique address of the device at the destination by sending out a broadcast to all the devices on the LAN to get the required unique address.

Communications with devices on other LAN segments requires the use of a router. As networks expand, more routers are needed to separate users into broadcast and collision domains and provide connectivity to other LANs. One drawback to this design is that routers add latency, which essentially delays the transmission of data. This is caused by the process involved in routing data from one LAN to another. A router must use more of the data frame to determine destinations and route the data to the appropriate end node. Virtual LANs (VLANs) can be viewed as a group of devices on different physical LAN segments which can communicate with each other as if they were all on the same physical LAN segment. (based on http://net21.ucdavis.edu/newvlan.htm)

Thus, a Virtual LAN (VLAN) is any broadcast domain that is partitioned and isolated in a computer network at the data link layer (Layer 2). A Virtual LAN is created by applying VLAN tags to network frames to allow the tagged network frames to physically share some of the same network equipment but to function as if the network frames with a particular VLAN tag were on their own network. (Summary drawn from material found at https://en.wikipedia.org/wiki/Virtual_LAN (spaces inserted to avoid live link)).

The VLAN tag may be a field in the header of a data frame. For example, the VLAN tag may be a few bits that identify the VLAN ID number. The most widely accepted standard for implementing VLANs in an Ethernet network is defined by the IEEE in its 802.1Q standard (sometimes called Dot1q). Implementing 802.1Q VLANs involves tagging frames with a Tag Control Information field that identifies the VLAN to which the frames belong. According to the 802.1Q standard, the Tag Control Information field includes a 12-bit VLAN Identifier (ID) field (an example of a VLAN ID) that enables VLANs to be uniquely identified. Those of skill in the art will be familiar with the IEEE 802.1Q standard which evolves over time. Those not familiar with the standard may find the introduction from Wikipedia on IEEE 802.1Q collected on May 21, 2018 by Archive.org to be informative. See https://web.archive.org/web/20180521023816/https://en.wikipedia.org/wiki/IEEE_802.1Q. The referenced stored material is incorporated by reference.

Within the telecommunication connecting many different customers over some shared communications links, carrier network operators use Virtual LANs (VLANs) to provide isolation of customer traffic across shared network infrastructure. Configurable, VLAN-aware switches use the VLAN IDs to make decisions such as which ports or interfaces to send a frame out on.

Figure 1:
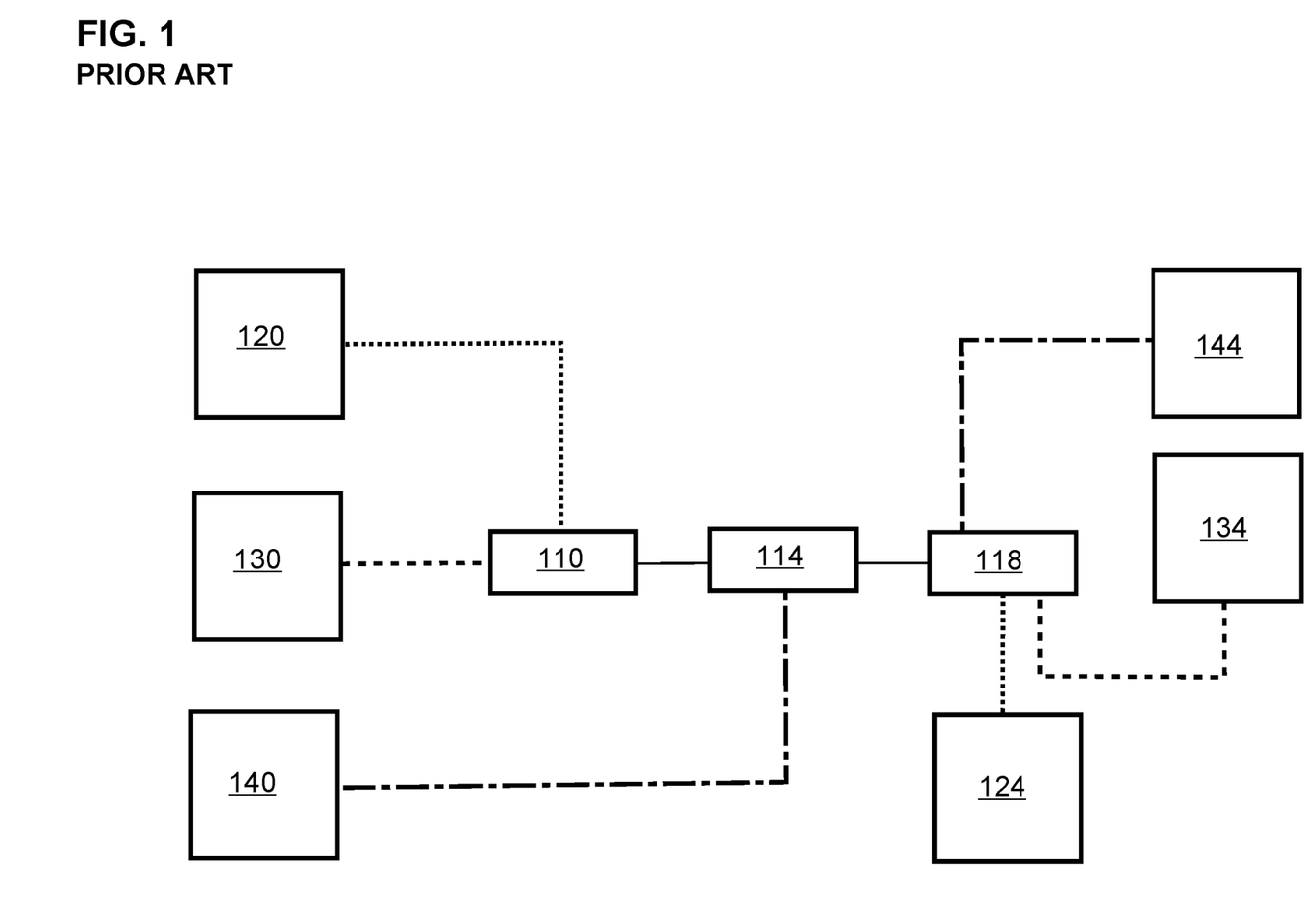

FIG. 1 shows a prior art network 100 with network components that are VLAN-aware switches 110, 114, 118 that connect:

network assets 120 and 124 on a first VLAN;
network assets 130 and 134 on a second VLAN; and
network assets 140 and 144 on a third VLAN.

The topology of the prior art network 100 shown in FIG. 1 is arbitrary and intended to show VLAN-aware switches 110, 114, and 118 which may be configured so that specific ports are allocated to specific VLANs. A port may be enabled to convey traffic from two or more VLANs such as the ports on VLAN-aware switch 114 that are connected to VLAN-aware switches 110 and 118. Use of VLANs keeps the traffic on the first VLAN segregated from the traffic on the second or third VLAN. Thus, network asset 124 does not see traffic destined for other VLANs as VLAN-aware switch 118 will not allow that other VLAN traffic onto the port connected to network asset 124.

Figure 2:
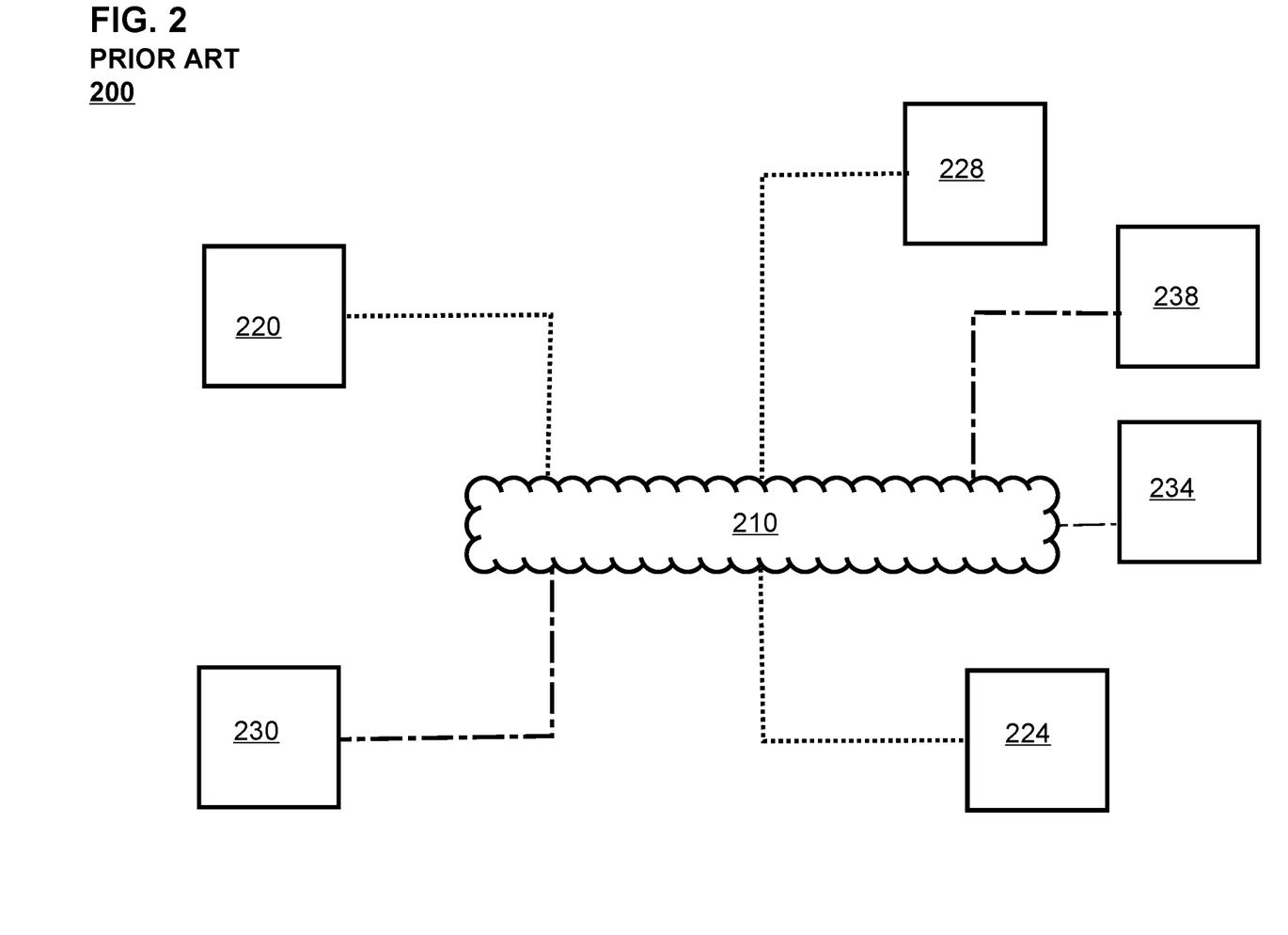
FIG. 2 shows equipment at several locations connected through a carrier network that employs VLANs.

The same concept of a set of VLANs using a network can be extended as shown in FIG. 2. Here network 200 connects customer facilities across great distances via a carrier network 210. But the various components of CPE (customer premises equipment or sometimes customer provided equipment) at location 220 can communicate via a VLAN with CPE at location 224 or CPE at location 228 on a first VLAN. CPE at location 230 can likewise communicate with CPE at location 234 or at location 238 via a second VLAN. The VLAN ID on network frames going amongst locations 220, 224, and 228 differs from the VLAN ID on network frames going amongst locations 230, 234, and 238.

An advantage of using VLAN tags is that data from CPE at location 220 might reach a VLAN-aware switch that connects customer locations to the carrier network 210 along with data from CPE at location 230. Normally a switch would consider all the ports connected to the switch as being part of a local area network and certain frames reaching the switch would get broadcast out to all ports on the switch (except the port that provided the frame). Thus, frames would be sent to CPE at location 220 that are relevant only to CPE at location 230 as location 220 is for a first company and location 230 is for a second company. Effective use of VLAN tags would cause the VLAN-aware switch to not broadcast a frame with a VLAN ID code associated with CPE at location 220 to CPE at location 230 and vice versa. While FIG. 2 has only a few customer locations to allow for a simple instructive figure, a carrier network may have thousands of customer locations so reducing the broadcast traffic going to irrelevant locations has a significant impact.

One way to implement a VLAN is to use tagged VLAN frames where the originating device adds a unique VLAN ID to any outgoing frame. To make this work across a distance between two customer locations, equipment at both customer locations at different ends of the VLAN needed to be configured to use a specific VLAN ID ("tag") on outgoing frames and look for the same VLAN tag on incoming traffic.

Vocabulary.

Unless explicit to the contrary, the word "or" should be interpreted as an inclusive or rather than an exclusive or. Thus, the default meaning of or should be the same as the more awkward and/or.

Unless explicit to the contrary, the word "set" should be interpreted as a group of one or more items.

Unless explicit to the contrary, the term "network edge device" should be interpreted broadly as a network device that is connected to network cloud infrastructure, often directly connected.

SUMMARY OF THE DISCLOSURE

Aspects of the teachings contained within this disclosure are addressed in the claims submitted with this application upon filing. Rather than adding redundant restatements of the contents of the claims, these claims should be considered incorporated by reference into this summary.

One summary of the present disclosure is a system that allows network devices to automatically detect received VLAN-tagged frames. The detected VLAN ID and related fields are stored, and the VLAN tag removed during ingress. On egress, the device tags the previously stored VLAN tag on all outgoing frames. This process to mark outgoing frames with the VLAN ID for a particular VLAN occurs without the intervention of a technician visiting the location with the network equipment and does not require elaborate handshakes with an external authentication server or Layer 3 service to request an allocation of a VLAN ID.

Some of the teachings of the present disclosure may be summarized by a method to allow a set of devices at a first location to participate in a VLAN using a first specific VLAN ID without expressly programming the set of devices at the first location to use that first specific VLAN ID. The set of devices at the first location includes a network edge device connected to a network and a set of non-edge devices at the first location that can communicate with the network edge device. The method includes:
  A) configuring a set of network devices in a network to handle VLAN traffic with the first specific VLAN ID so that a broadcast VLAN message with the first specific VLAN ID can reach the network edge device at the first location;
  B) sending a broadcast VLAN message with the first specific VLAN ID such that the broadcast VLAN message reaches the network edge device at the first location;
  C) copying the first specific VLAN ID from the broadcast VLAN message with the first specific VLAN ID as a VLAN ID into memory accessible to the network edge device;
  D) reading the VLAN ID from the memory accessible to the network edge device; and
  E) tagging frames from the set of devices at the first location with the VLAN ID before the frames egress onto the network.

The teachings of the present disclosure may be extended to be used with network edge devices that are connected to a wide area network through a wired or wireless connection but are not connected to local non-edge devices.

Some of the teachings of the present disclosure may be summarized as teaching the creation of a network edge device provided with a processor and instructions to allow the network edge device while at a first location to participate in a VLAN using a first specific VLAN ID without expressly programming the network edge device at the first location to use that first specific VLAN ID. The network edge device is adapted for connection to a network to receive ingressing frames from the network and to send egressing frames to the network.

The network edge device is adapted to copy the first specific VLAN ID from a broadcast VLAN message with the first specific VLAN ID as a VLAN ID into memory accessible to the network edge device.

The network edge device is adapted to subsequently read the VLAN ID from the memory accessible to the network edge device. The network edge device is also adapted to tag frames egressing from the network edge device at the first location with the VLAN ID before the frames egressing from the network edge device are transmitted onto the network.

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Inventive concepts are illustrated in a series of examples, some examples showing more than one inventive concept. Individual inventive concepts can be implemented without implementing all details provided in a particular example. It is not necessary to provide examples of every possible combination of the inventive concepts provided below as one of skill in the art will recognize that inventive concepts illustrated in various examples can be combined together in order to address a specific application.

Other systems, methods, features and advantages of the disclosed teachings will be immediately apparent or will become apparent to one with skill in the art upon examination of the following figures and detailed description. It is intended that all such additional systems, methods, features and advantages be included within the scope of and be protected by the accompanying claims.

BRIEF DESCRIPTION OF THE FIGURES

The disclosure can be better understood with reference to the following figures. The components in the figures are not necessarily to scale, emphasis instead being placed upon FIG. 1 introduces a prior art network having VLANs.

DETAILED DESCRIPTION

The presently disclosed subject matter is described with specificity to meet statutory requirements. However, the description itself is not intended to limit the scope of this patent. Rather, the inventor has contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 3:
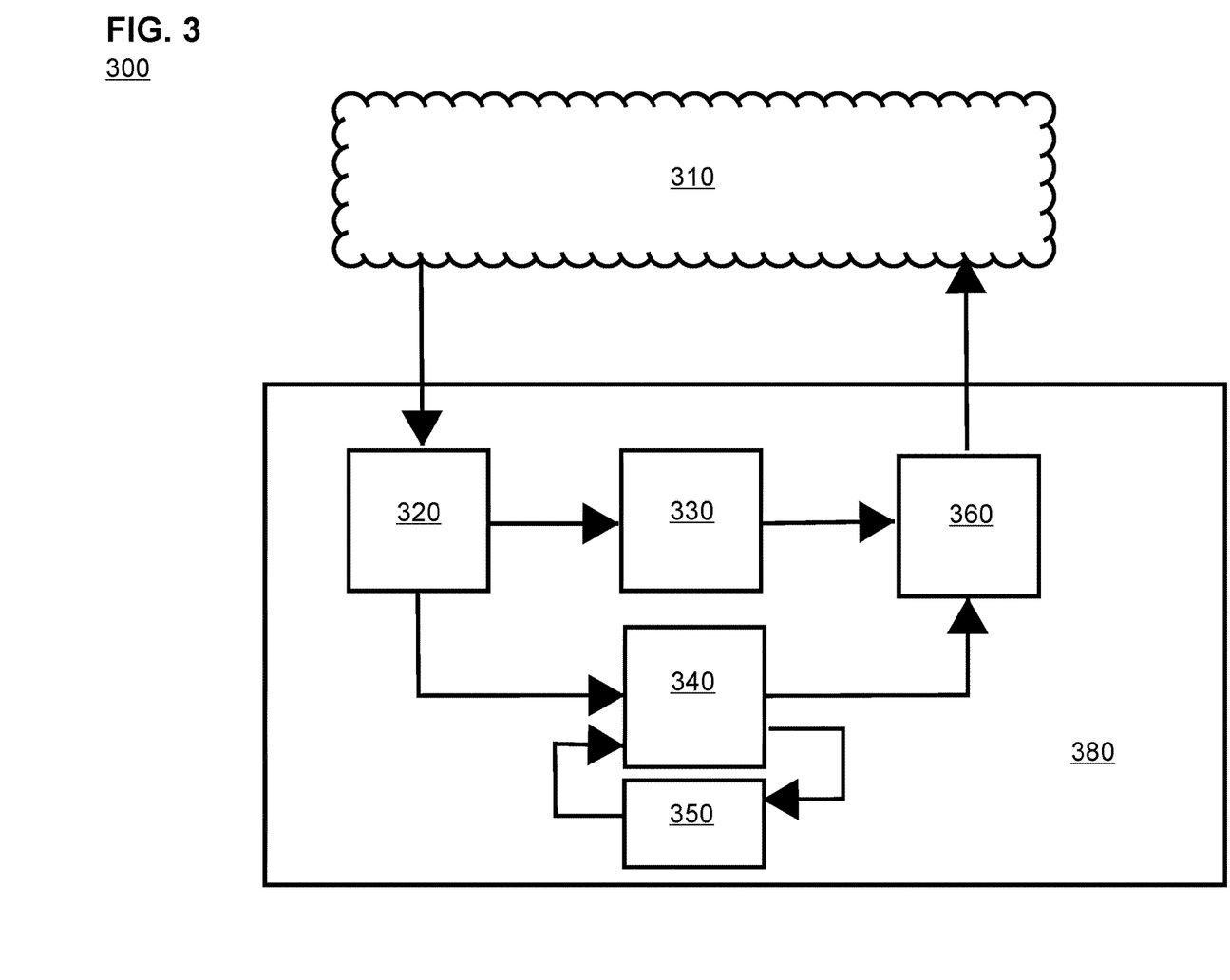
FIG. 3 illustrates a network device processing ingressing and egressing frames associated with a VLAN.

FIG. 3 shows a carrier network 300 with cloud 310. Cloud 310 could represent a single device, or an assortment of network infrastructure such as switches and routers, or it could represent the worldwide Internet. A network edge device 380 receives incoming frames at ingress frame processing 320. Ingress frame processing 320 examines the incoming Layer 2 frames and notes the VLAN ID and optionally additional fields such as PCP, DEI, TPID, and others. (See discussion in Alternatives and Variations for the use of these additional fields.)

The incoming information for the frame is stored in data storage 330. The location of the data storage 330 may be outside of network edge device 380 as long as the information stored is readily accessible to the network edge device 380. The ingress frame processing 320 removes the VLAN header information from the frame and then sends the modified frame to the network stack 340 for additional processing including miscellaneous network processing 350. The frames may move from network edge device 380 to local devices (not shown) connected directly or indirectly to network edge device 380. The local devices may be called non-edge devices as they are not at the edge between the local network and the carrier network in contrast to network edge device 380.

Frames heading outbound (egressing frames) come from miscellaneous network processing 350 or network stack 340 and move to egress frame processing 360 where the previously stored VLAN ID and any other stored fields are added to the egressing frame before the modified frame is passed out of the network edge device 380 to the cloud 310. The egressing frames may have originated in local devices (not shown) connected directly or indirectly to network edge device 380. These devices may be called non-edge devices.

Note that the network edge device 380 was not manually configured and did not engage with a set of handshakes with a remote authorization server. Instead the frames egressing from the network edge device 380 reflected or echoed the VLAN ID and any other selected fields from the ingressing frames. Network edge device 380 may be a network edge device that is connected at the edge of a carrier network and is also connected to equipment at the customer location.

Thus a new set of CPE can be added to a particular customer VLAN by simply sending a data frame to a device such as a network edge device within the set of CPE and including in the data frame the VLAN ID for the customer VLAN. The CPE device such as a network edge device will adopt the VLAN ID and use that VLAN ID on traffic egressing network edge device 380 to the cloud 310 of carrier network 300.

Connecting a New VLAN.

Figure 4:
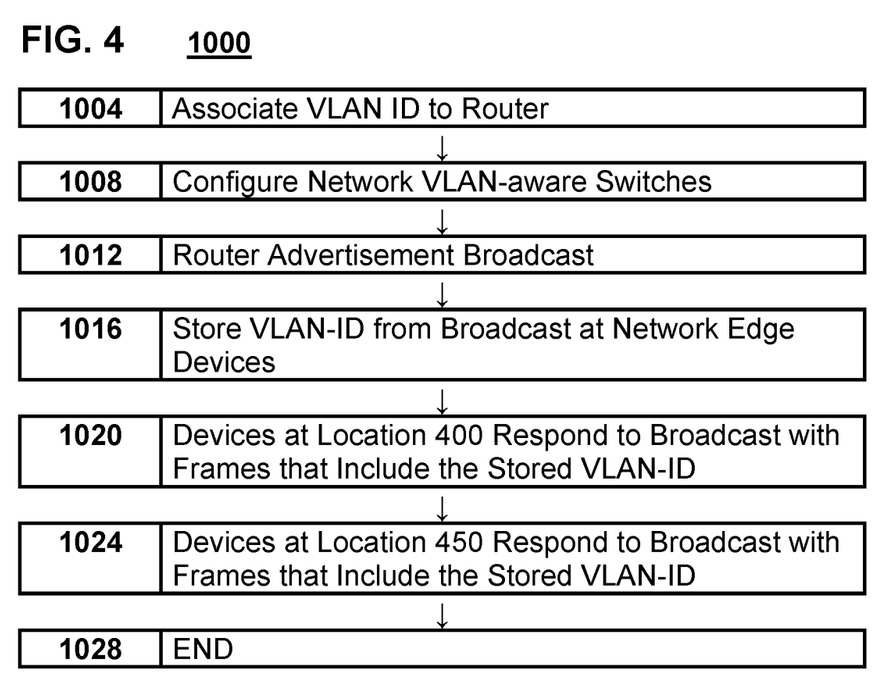
FIG. 4 is a flow chart for a process to connect a new customer with a unique VLAN ID to a carrier network.
Figure 5:
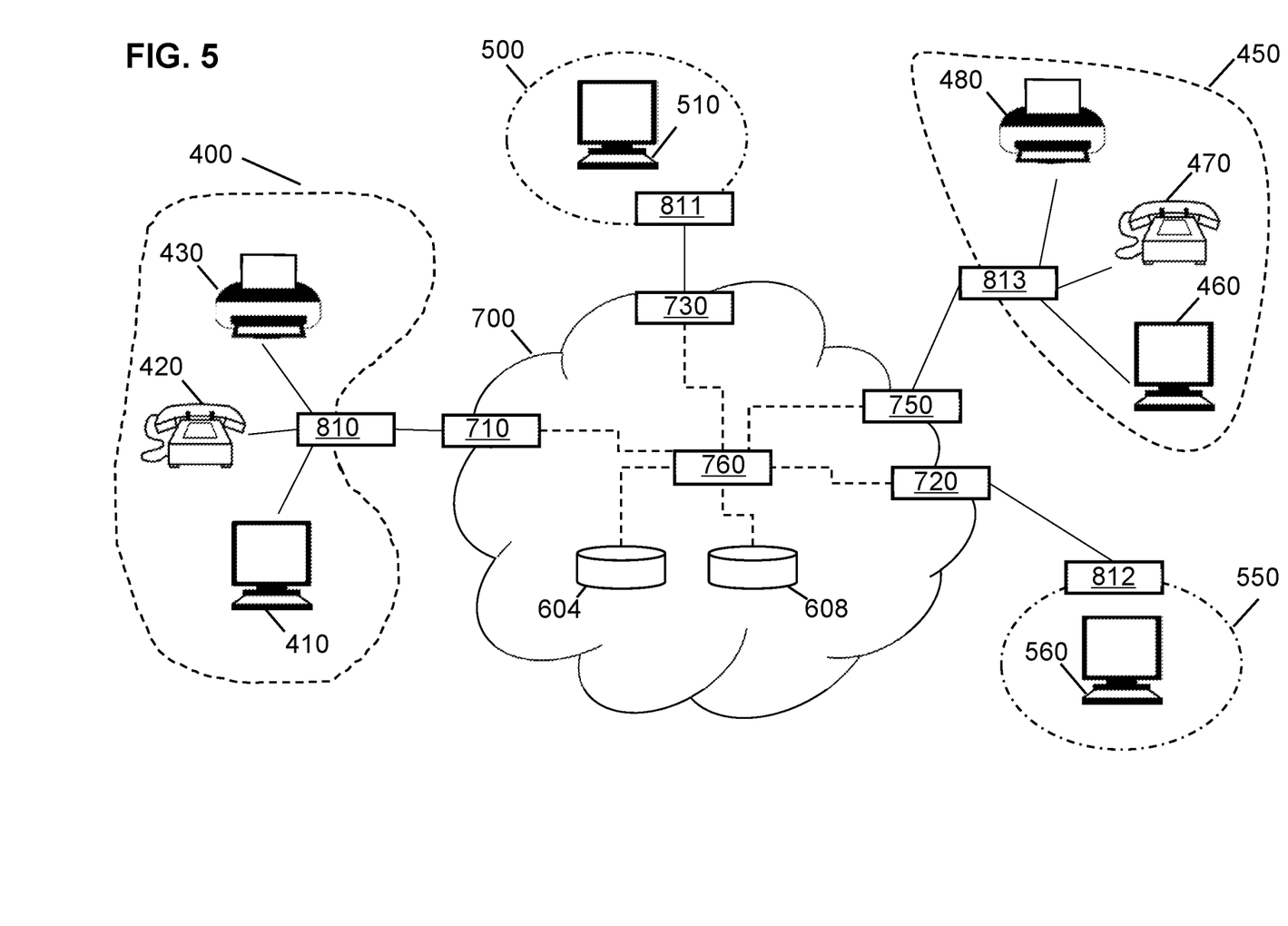
FIG. 5 is the network diagram used to explain the process of FIG. 4.

FIG. 4 is a flow chart for process 1000 to connect a new customer with a first location and a second location to a carrier network and to give the new customer a unique VLAN ID. FIG. 5 is the network diagram used to explain the process 1000 in FIG. 4.

In this simplified example of a network, a carrier network 700 connects together different physical locations. The carrier network 700 is connected to a VLAN-aware switch 760. The VLAN-aware switch 760 is connected to a set of routers such as IPV6 routers 604 and 608 (hereinafter "routers"). Each router 604, 608 may be used to connect a VLAN existing on the carrier network 700 to other networks (not shown here to avoid clutter). While only two routers 604 and 608 are shown here, those of skill in the art will appreciate that there may be hundreds or thousands of physical or virtual routers connected to the carrier network 700.

Already connected to the carrier network 700 is a customer with two locations 500 and 550. Network edge device 811 connects the CPE such as device 510 at location 500 to the carrier network 700 via VLAN-aware switch 730.

Likewise, network edge device 812 connects the CPE such as device 560 at location 550 to the carrier network 700 via VLAN-aware switch 720.

Traditionally, to connect device 510 at location 500 and device 560 at location 550 to a customer VLAN, each device at the customer location 500 and 550 would need to be individually added to the VLAN. This meant that someone with adequate network administrator skills would need to be at the customer site to make these changes.

Assume that a new customer with locations 400 and 450 wishes to have the two locations on a VLAN. The CPE at location 400 is represented by devices 410, 420, and 430 although there may be many more devices. A network edge device 810 is connected to a VLAN-aware switch 710 to access the carrier network 700.

Likewise, the CPE at location 450 is represented by devices 460, 470, and 480 although there may be many more devices. A network edge device 813 is connected to a VLAN-aware switch 750 to access the carrier network 700.

Router 604 is assigned to support a new VLAN to connect location 400 to location 450 and to serve as a gateway to networks (not shown) beyond the carrier network 700.

The process 1000 to add the devices at locations 400 and 450 to a new VLAN would be as follows.

Step 1004—Router 604 is associated with a unique VLAN ID. For sake of this example, the VLAN ID will be 327. Router 604 will serve as the gateway between this VLAN and the rest of the network beyond the carrier network 700. The provision of the VLAN ID for the router 604 may happen by associating the VLAN ID to the port on VLAN-aware switch 760 that is connected to the router 604. VLAN ID 327 should be unique within carrier network 700 but does not have to be unique for the entire set of connected networks beyond router 604. The addition of the VLAN ID may happen at each router such as router 604 or may happen at the VLAN-aware switch 760.

Step 1008—Configure carrier VLAN-aware switches. Once configured, the relevant VLAN-aware switch will be able to convey VLAN 327 traffic to and from network edge devices 810 and 813. The network carrier is able to talk to network carrier equipment to make configuration changes easily as these components are under the administrative control of the network carrier and respond to network carrier configuration tools. The changes include:

- The ports at VLAN-aware switch 760 connected to VLAN-aware switch 710 and VLAN-aware switch 750 are configured to handle VLAN 327 traffic.
- VLAN-aware switch 710 is configured to handle VLAN 327 traffic and send it on the port connected to network edge device 810 at customer location 400. Network edge device 810 is at the customer location 400 and not under control of the carrier. Network edge device 810 is not specially configured to handle traffic with VLAN ID 327.
- VLAN-aware switch 750 is configured to handle VLAN 327 traffic and send it on the port connected to network edge device 813 at customer location 450. Network edge device 813 is at the customer location 450 and not under control of the carrier. Network edge device 813 is not specially configured to handle traffic with VLAN ID 327.

Step 1012—Router Advertisement Broadcasts. Router 604 periodically broadcasts router advertisement messages. The outgoing broadcast router advertisement message leaving router 604 reaches VLAN-aware switch 760 on a port associated with VLAN 327. VLAN-aware switch 760 prepends the VLAN ID 327 to the broadcasted router advertisement message. The broadcast router advertisement message with VLAN ID 327 can pass through network equipment such as VLAN-aware switches 710 and 750 to reach network edge devices 810 and 813.

The broadcast router advertisement message with VLAN ID 327 cannot reach network edge device 811 at location 500 as VLAN-aware switch 730 will not send the traffic with VLAN ID 327 out the port heading to network edge device 811. Likewise, the broadcast router advertisement message with VLAN ID 327 cannot reach network edge device 812 at location 550 as VLAN-aware switch 720 won't send the traffic with VLAN ID 327 out the port heading to network edge device 812.

Step 1016—Store VLAN ID at network edge devices. Network edge device 810 has not been specifically configured to be part of VLAN 327 but has been configured in keeping with the teachings of this disclosure. Thus, when a broadcast router advertisement message marked with the appropriate VLAN ID 327 is delivered to network edge device 810, the network edge device 810 takes the VLAN ID and places that information in storage so that subsequent frames originating at location 400 but heading outbound towards carrier network 700 are marked with the stored VLAN ID 327. The storage may be within the network edge device 810 or may be in another memory storage device accessible by the network edge device 810.

Likewise network edge device 813 has not been specifically configured to be part of VLAN 327 but has been configured in keeping with the teachings of this disclosure. Thus, when a broadcast router advertisement message is marked with the appropriate VLAN ID 327 is delivered to network edge device 813, the network edge device 813 takes the VLAN ID and places that information in storage so that subsequent frames originating at location 450 but heading outbound towards carrier network 700 are tagged with the stored VLAN ID 327.

Step 1020—Devices at location 400 respond to the broadcast router advertisement message and these responses pass through network edge device 810 and are tagged with the stored VLAN ID 327. These responses reach the router 604 to inform router 604 of the existence of the devices 410, 420, and 430.

Step 1024—Devices at location 450 respond to the broadcast router advertisement message and these responses pass through network edge device 813 and are tagged with the stored VLAN ID 327. These responses reach the router 604 to inform router 604 of the existence of the devices 460, 470, and 480.

Step 1028—END. After these steps, all of the devices at locations 400 and 450 that are connected to the network edge devices 810 and 813 are now part of a VLAN with locally unique VLAN ID 327.

Communication Beyond a VLAN.

Note that if device 510 at location 500 on VLAN 196 wants to send a communication to device 410 at location 400 on VLAN 327, the frame originating at device 510 would be tagged with VLAN ID 196 at network edge device 811 and travel towards router 608 which serves as a gateway to the networks beyond the carrier network 700. At VLAN-aware switch 760, the VLAN tag is stripped off.

The frame travels out of the carrier network 700 through router 608 and reaches router 604 using conventional routing techniques. The frame passes through router 604 and into VLAN-aware switch 760 which tags frames arriving on the port connected to router 604 with VLAN ID 327. Now the frame is part of the VLAN 327 traffic and reaches device 410. The trip for a response from device 410 at location 400 on VLAN 327 back to device 510 at location 500 on VLAN 196 would be the reverse.

Advantages.

The use of a simple network in FIG. 5 to illustrate the concepts of the present disclosure may undersell the advantages of the teachings of the present disclosure. However, those of skill in the art will recognize that there is a fundamental difference between making configuration changes to equipment under control of the network carrier (such as routers 604 and 608, and VLAN-aware switches 710, 720, 730, 750, and 760) and equipment at customer locations 400, 450, 500, and 550. Even network edge devices such as network edge device 810 cannot be adjusted from afar as the network edge device 810 is not yet fully connected to the carrier network 700. The adjustments to network edge device 810 to add a VLAN ID such as 327 would either need to be done by a technician with network administration skills who travels to location 400 or preplanned by preconfiguring all network edge devices to be used in the process at a central location before shipping the network edge devices 810 and 813 to customer locations 400 and 450.

While preconfiguring two network edge devices may seem viable, the VLAN 327 may be serving hundreds of stores or thousands of gas stations. Additional stores or gas stations may be added weekly. Thus, a prior art solution would have required a visit by a network technician to each gas station or store as these facilities are not going to have a network technician on site. This is known as a truck-roll and it is deemed a large expense that is best to avoid.

Change of VLAN ID.

From time to time, companies acquire other companies or otherwise have reasons to merge what were two distinct VLAN networks into one VLAN. Conversely, situations arise such as a divestment or other change where a company may wish to have certain locations pulled off an existing VLAN and placed on a different VLAN.

To illustrate the change of the VLAN ID, assume that the company with locations 400 and 450 on VLAN 327 acquires the company with locations 500 and 550 on VLAN 196.

VLAN-aware switch 760 which is at a carrier location will be configured to associate traffic on the port connected to router 608 with VLAN 327. VLAN-aware switch 720 will have the relevant ports associated with VLAN 327. VLAN-aware switch 730 will have the relevant ports associated with VLAN 327.

The sequence of events to completely perform this change will differ slightly depending on the configuration of network edge devices 810, 811, 812, and 813.

Those of skill in the art will recognize that the merger of the two VLANs may include removal of router 608 and use of router 604 by all customer locations that will be part of the merged VLAN. It is beyond the focus of the present disclosure, but the merged company may find some reason for keeping both router 604 and router 608 so that the devices at customer locations 500 and 550 while on the same Layer 2 VLAN are on different Layer 3 networks.

The process of changing a VLAN ID for a set of devices at a physical location that are already connected to a network where the network know things like MAC addresses for the devices at a customer location could use a non-broadcast message to convey the new VLAN ID as the message could be sent to a device within the physical location given information already known and indexed about that device.

Dynamic Operation.

The network edge devices 810, 811, 812, and 813 may be configured to react dynamically to frames arriving at customer locations 400, 450, 500, and 550 so that should a frame marked with VLAN 327 reach network edge device 811, the network edge device 811 will use VLAN ID 327 for tagging all future frames leaving location 500 through device 811. Thus, once the equipment under carrier control is set to use the new VLAN ID, the change will be automatic at the customer locations 500 and 550.

Optionally, the number of times that the VLAN ID has changed can be stored and made available to operators monitoring the performance of the network edge device.

Static Operation.

The network edge devices 810, 811, 812, and 813 may be configured to retain the VLAN ID and not change upon receipt of a VLAN ID that is different. The network edge devices may have the stored VLAN ID in volatile storage so that if the network edge device 810, 811, 812, or 813 is turned off for an adequate time, then the stored VLAN ID is lost. This would require someone at the customer location 500 to turn off network edge device 811 and turn the network edge device back on so that a subsequent router broadcast announcement from router 608 would be received at network edge device 811 and the network edge device 811 would strip the VLAN ID 327 from the incoming router broadcast announcement. The same process would be repeated at customer location 550.

If the network edge devices 810, 811, 812, and 813 were configured to statically store the VLAN ID in non-volatile storage then powering down the device would not remove the stored VLAN ID. A factory reset of the device would clear the VLAN ID. The process for a factory reset differs from device to device and may be as simple as inserting the end of a paperclip through an opening in the device housing to actuate a recessed switch. The process for a factory reset may need to be conveyed to an employee at each location but the process does not require special skills or passwords. Given that the merger of two VLANs or the splitting of a VLAN into two VLANs will be a relatively rare event, the added work of requiring a factory reset may be acceptable.

Network Edge Devices.

Figure 6:
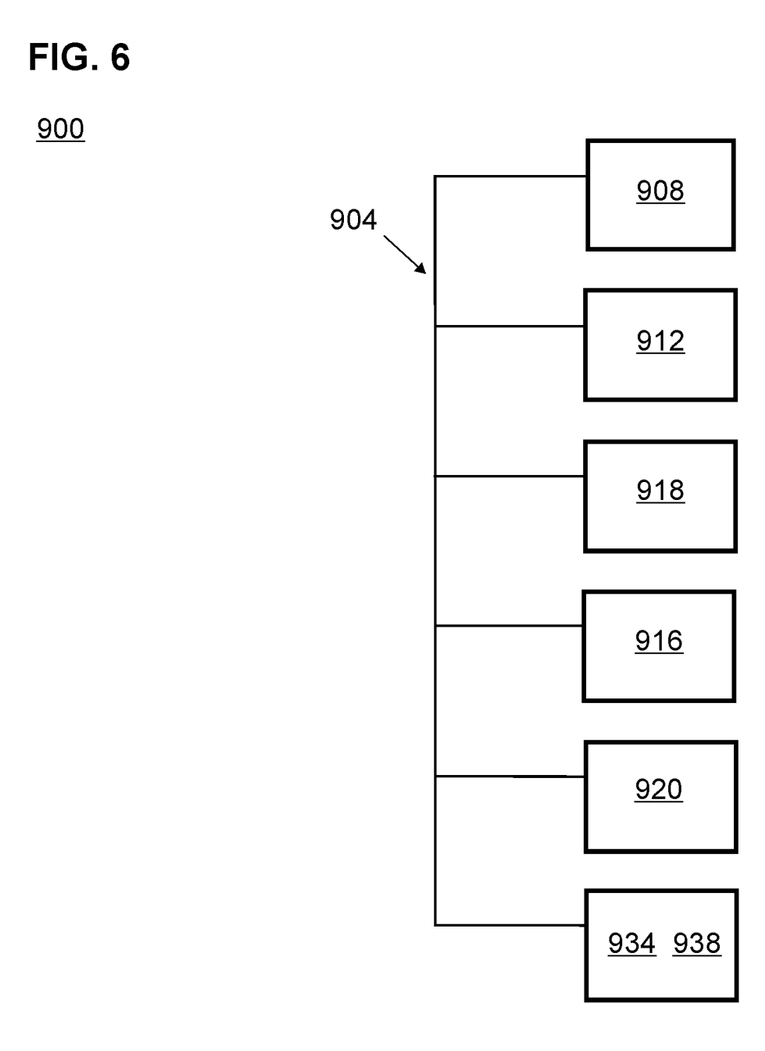
FIG. 6 displays a high-level representation of a network edge device.

FIG. 6 displays a high-level representation of a network edge device 900 configured to employ teachings of the present disclosure. This is a high-level representation keyed to the relevant components for the present disclosure. Those of skill in the art will recognize that this is not a detailed description of all components needed to make a network edge device. For example, FIG. 6 does not include a power supply, but conventional aspects of a network edge device need not be conveyed to those of skill in the art.

The network edge device 900 of FIG. 6 includes a bus 904 to allow various components to communicate with one another. The network edge device 900 may include both volatile memory 908 and non-volatile memory 912. The network edge device 900 will include one or more processors 916 that execute instructions which may be stored in the volatile memory 908, the non-volatile memory 912, or other memory dedicated for storage of the instructions 918. Instructions for use by the processor 916 may exist in hardware, firmware, or software.

The network edge device 900 may include at least one connection 920 to a network. The network may be a carrier network or another network that connects a series of local networks. The at least one connection 920 to the network may be a configured for a wired connection by any physical connection including optical and non-optical connections. The at least one connection may be any known wireless connection such as connection to a wireless telephone network.

The network edge device 900 may include at least one connection to a local network. The at least one connection to the network may be configured for a wired connection 934 by any physical connection including optical and non-optical connections. The at least one connection may be any known wireless connection 938 such as connection to a wireless telephone network. In some instances both a wired connection 934 and a wireless connection 938 may be used to reach various components within a local network.

In some instances, the network edge device 900 does not have any connected non-edge devices so the only frames ingressing or egressing from the network edge device 900 are frames traveling to or from the network edge device 900.

Thus, a network edge device 900 may be configured to operate with instructions that cause the network edge device 900 to implement the teachings of the present disclosure so that the network edge device 900 effectively learns the VLAN ID from an ingressing frame and uses that VLAN ID for egressing frames.

It will be understood, and is appreciated by persons skilled in the art, that one or more processes, sub-processes, or process steps described this disclosure may be performed by a combination of hardware and software. The software may reside in software memory internal or external to the processing unit 916, or other controller, in a suitable electronic processing component or system such as one or more of the functional components or modules. The software in memory may include an ordered listing of executable instructions for implementing logical functions (that is, "logic" that may be implemented either in digital form such as digital circuitry or source code or in analog form such as analog circuitry), and may selectively be embodied in any tangible computer-readable medium for use by or in connection with an instruction execution system, apparatus, or device, such as a computer-based system, processor-containing system, or other system that may selectively fetch the instructions from the instruction execution system, apparatus, or device and execute the instructions.

In the context of this disclosure, a "computer-readable medium" is any means that may contain, store, communicate, propagate, or transport the program for use by or in connection with the instruction execution system, apparatus, or device. The computer readable medium may selectively be, for example, but is not limited to, an electronic, magnetic, optical, electromagnetic, infrared, or semiconductor system, apparatus, device, or medium. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic), and a portable compact disc read-only memory "CDROM" (optical) or similar discs (e.g., DVDs and Rewritable CDs).

It is also important to note that although the present disclosure has been described in the context of a fully functional system using network edge devices 900, those skilled in the art will appreciate that the mechanisms of the present disclosure are capable of being distributed as a program product or a portion of a suite of programs. This distribution may be done in a variety of forms. The inventiveness of the present disclosure is present in a set of computer instructions adapted to implement some or all of the innovations described above regardless of how this set of instructions is conveyed. A set of computer instructions is a set of instructions adapted for use by a computer in achieving some or all of the advantages set forth above and is distinguishable from a paper such as this disclosure that describes the attributes of an implementation without providing anything that can be processed by computer components to ultimately be executed by a computer.

Alternatives and Variations

Carrier Network.

The teachings of the present disclosure have been illustrated with reference to use to connect client locations across a carrier network. The teachings of the present disclosure may be used across other networks such as the large networks found in hospitals, universities, and research campuses.

Broadcast Messages.

The example set forth above had a router broadcast message as the message that reached the network edge devices to allow them to copy the particular VLAN ID. Those of skill in the art will appreciate that a network has a number of different broadcast messages that are sent out and the teachings of this disclosure should not be limited to use of a particular broadcast message that reaches a network edge device to convey the VLAN ID.

CPE VLANs.

Note that after the network edge device removes the VLAN tag from a frame ingressing from the carrier network, that network edge device could apply another VLAN tag for use with VLANs used within a particular customer location such as 400, 450, 500, and 550.

Solitary Network Edge Devices.

The example used to convey the teachings of the present disclosure used a set of customer locations 400, 450, 500, and 550 with network edge devices and additional non-edge devices. This is a common pattern. Note that the teachings of the present disclosure could be used with a customer location that has only one device which is the network edge device. An example may be an array of signs on a highway that are in contact with a carrier network and need to be operated as a VLAN within the carrier network. The signs may receive frames to instruct the sign to display a particular warning or alert. In the internet of things, there may be many use cases where a single device is connected to a carrier network but needs to be on a VLAN with other devices.

Tag Protocol Identifier.

The Tag Protocol Identifier "TPID" is usually set to 0x8100 for IEEE802.1Q VLAN frames. However, other values might be valid depending on the protocol (including, but not limited to, 802.1aq).

The present disclosure may be extended to store the incoming TPID information and use that on outgoing data frames.

Alternatively, the outgoing data frames from the second customer location may have a TPID value that is configured by the user and unaffected by incoming data frames.

Priority Code Point.

The Priority Code Point "PCP" can be used to prioritize different classes of traffic. The present disclosure may be extended to store the incoming PCP information and use that on outgoing data frames.

Alternatively, the outgoing data frames from the second customer location may have a PCP value that is configured by the user and unaffected by incoming data frames.

Drop Eligible Indicator.

The Drop Eligible Indicator "DEI" can be used to indicate frames that are eligible to be dropped in the presence of congestion. The present disclosure may be extended to store the incoming DEI information and use that on outgoing data frames.

Alternatively, the outgoing data packets from the second customer location may have a DEI value that is configured by the user and unaffected by incoming data.

Other VLAN Tagging Protocols.

While the present disclosure references the IEEE 802.1Q standard as a widely used standard for marking frames with VLAN tags, those of skill in the art will appreciate that the teachings of the present disclosure may be used with other protocols such as IEEE 802.1aq as long as the relevant devices know where to look for the VLAN ID used in that protocol so that the incoming VLAN ID may be retained and reflected in subsequent outgoing VLAN IDs.

One of skill in the art will recognize that some of the alternative implementations set forth above are not universally mutually exclusive and that in some cases additional implementations can be created that employ aspects of two or more of the variations described above. Likewise, the present disclosure is not limited to the specific examples or particular embodiments provided to promote understanding of the various teachings of the present disclosure. Moreover, the scope of the claims which follow covers the range of variations, modifications, and substitutes for the components described herein as would be known to those of skill in the art.

Where methods and/or events described above indicate certain events and/or procedures occurring in a certain order, the ordering of certain events and/or procedures may be modified. Additionally, certain events and/or procedures may be performed concurrently in a parallel process when possible, as well as performed sequentially as described above.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

What is claimed is:

1. A method to allow a set of devices at a first location to participate in a VLAN using a first specific VLAN ID without expressly programming the set of devices at the first location to use that first specific VLAN ID;
the set of devices at the first location including a network edge device connected to a network and a set of non-edge devices at the first location that can communicate with the network edge device;
the method comprising:
A) configuring a set of network devices in a network to handle VLAN traffic with the first specific VLAN ID so that a broadcast VLAN message with the first specific VLAN ID can reach the network edge device at the first location;
B) sending a broadcast VLAN message with the first specific VLAN ID such that the broadcast VLAN message reaches the network edge device at the first location;
C) copying the first specific VLAN ID from the broadcast VLAN message with the first specific VLAN ID as a VLAN ID into memory accessible to the network edge device;
D) reading the VLAN ID from the memory accessible to the network edge device; and
E) tagging egressing frames from the set of devices at the first location with the VLAN ID before the egressing frames egress onto the network.

2. The method of claim 1 wherein the network is a carrier network.

3. The method of claim 1 wherein the VLAN ID and at least one additional VLAN field are found in a VLAN header that marks frames ingressing from the network; and
the VLAN header is removed from frames ingressing from the network at the network edge device so that a first frame ingressing from the network to the network edge device, leaves the network edge device transmitted to a non-edge device without the VLAN header.

4. The method of claim 1 wherein tagging frames from the set of devices at the first location with the first specific VLAN ID before the frames transmit onto the network creates frames that are IEEE 802.1Q conformant.

5. The method of claim 1 wherein at least one VLAN field from a VLAN header is copied along with the first specific VLAN ID from the broadcast VLAN message into memory accessible to the network edge device; and
egressing frames from the set of devices at the first location are tagged with the VLAN ID and the at least one VLAN field from the VLAN header in addition to the VLAN ID before the frames transmit onto the network.

6. The method of claim 1 wherein
frames from the set of devices at the first location are tagged with the VLAN ID and one additional VLAN field in a VLAN header, wherein a value for the one additional VLAN field is configured at a device at the first location.

7. The method of claim 1 wherein the network edge device
responds to receipt of broadcast VLAN message with a second specific VLAN ID after receiving a broadcast VLAN message with the first specific VLAN ID and copies the second specific VLAN ID from the broadcast VLAN message with the second specific VLAN ID as the VLAN ID into memory accessible to the network edge device; and
begins tagging egressing frames from the set of devices at the first location with the second specific VLAN ID as the VLAN ID before the frames transmit onto the network.

8. The method of claim 7 wherein a number of times that the VLAN ID has changed can be stored and made available to operators monitoring operation of the network edge device.

9. The method of claim 1 wherein the network edge device responds to receipt of a broadcast VLAN message with a second specific VLAN ID after receiving a broadcast VLAN message with the first specific VLAN ID by ignoring the broadcast VLAN message with the second specific VLAN ID; and
continues tagging egressing frames from the set of devices at the first location with the first specific VLAN ID before the frames transmit onto the network.

10. The method of claim 1 wherein the network edge device continues tagging egressing frames from the set of devices at the first location with the first specific VLAN ID until:
the first specific VLAN ID stored in memory accessible to the network edge device is erased; and
a new specific VLAN ID is copied from an ingressing VLAN message with the new specific VLAN ID received at the network edge device from the network.

11. The method of claim 10 wherein the first specific VLAN ID is erased by powering down the network edge device.

12. The method of claim 10 wherein the first specific VLAN ID is erased by a factory reset of the network edge device.

13. The method of claim 10 wherein the first specific VLAN ID is erased by operation of a user command.

14. A method to allow a network edge device at a first location to participate in a VLAN using a first specific VLAN ID without expressly programming the network edge device at the first location to use that first specific VLAN ID;
the network edge device connected to a network;
the method comprising:
A) configuring a set of network devices in a network to handle VLAN traffic with the first specific VLAN ID so that a broadcast VLAN message with the first specific VLAN ID can reach the network edge device at the first location;
B) sending a broadcast VLAN message with the first specific VLAN ID such that the broadcast VLAN message reaches the network edge device at the first location;
C) copying the first specific VLAN ID from the broadcast VLAN message as a VLAN ID into memory accessible to the network edge device;
D) reading the VLAN ID from the memory accessible to the network edge device; and
E) tagging egressing frames from the network edge device at the first location with the VLAN ID before the egressing frames egress onto the network.

15. A network edge device provided with a processor and instructions to allow the network edge device while at a first location to participate in a VLAN using a first specific VLAN ID without expressly programming the network edge device at the first location to use that first specific VLAN ID;
the network edge device adapted for connection to a network to receive ingressing frames from the network and to send egressing frames to the network;
the network edge device adapted to copy the first specific VLAN ID from a broadcast VLAN message with the first specific VLAN ID as a VLAN ID into memory accessible to the network edge device;

the network edge device adapted to subsequently read the VLAN ID from the memory accessible to the network edge device; and the network edge device adapted to tag frames egressing from the network edge device at the first location with the VLAN ID before the frames egressing from the network edge device are transmitted onto the network.

16. The network edge device of claim 15 wherein the network edge device is connected to the network with a physical connection.

17. The network edge device of claim 15 wherein the network edge device is connected to the network by a wireless connection.

18. The network edge device of claim 15 wherein the network edge device is connected to a local network and transmits at least some frames received from the network to the local network for delivery to non-edge devices in the local network.

19. The network edge device of claim 18 wherein the network edge device is connected to the local network through at least one wireless connection.

20. The network edge device of claim 18 wherein the network edge device is connected to the local network through at least one wired connection.

21. The network edge device of claim 15 wherein the network edge device is connected to a local network and transmits at least some frames received from the local network to the network for delivery to a device at a physical location remote from the network edge device but part of a VLAN using a first specific VLAN ID.

* * * * *